INVENTOR
OWEN P. BARNES, JR.

BY K. Wilson Corder

ATTORNEY

April 11, 1967  O. P. BARNES, JR  3,312,998
MEAT PATTY MACHINE
Filed March 1, 1965  5 Sheets-Sheet 2
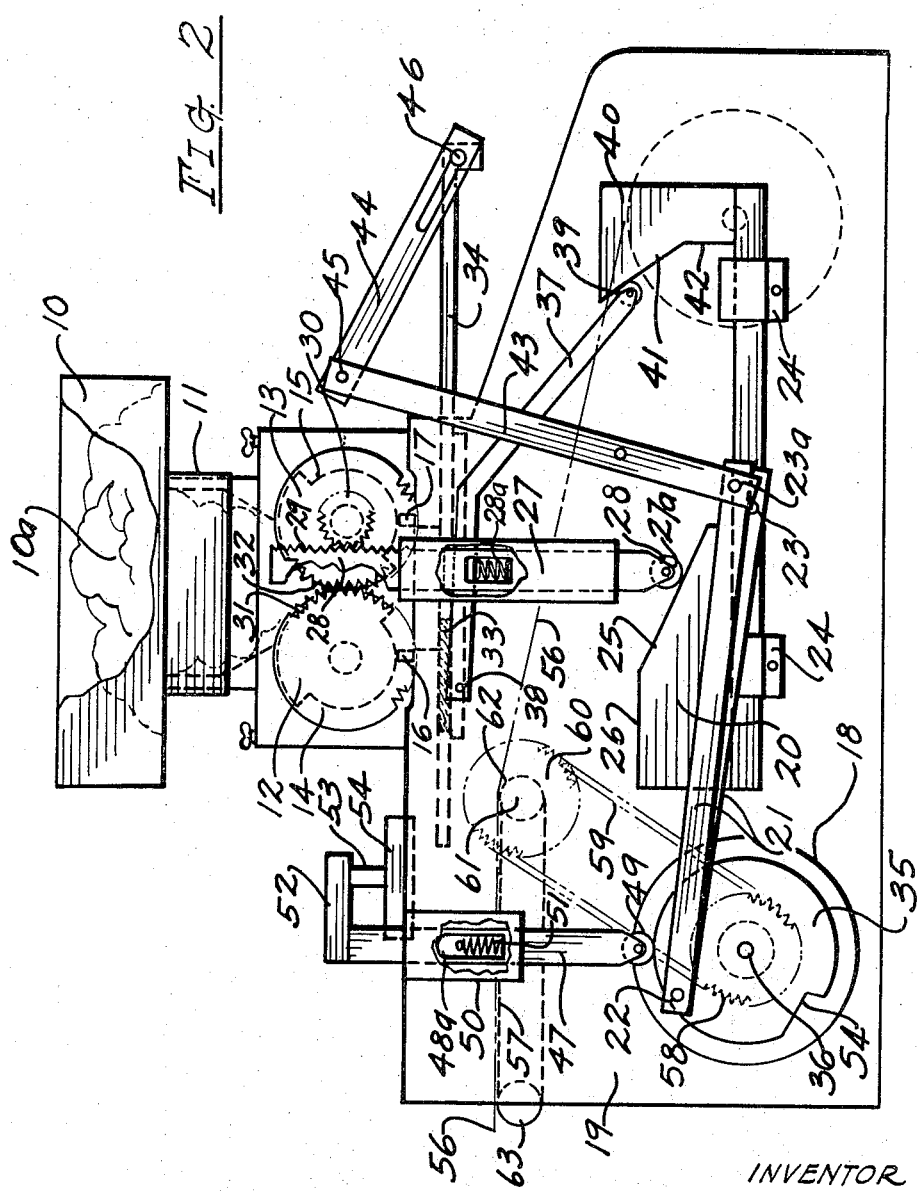
INVENTOR
OWEN P. BARNES, JR.
BY R. Wilson Corder
ATTORNEY

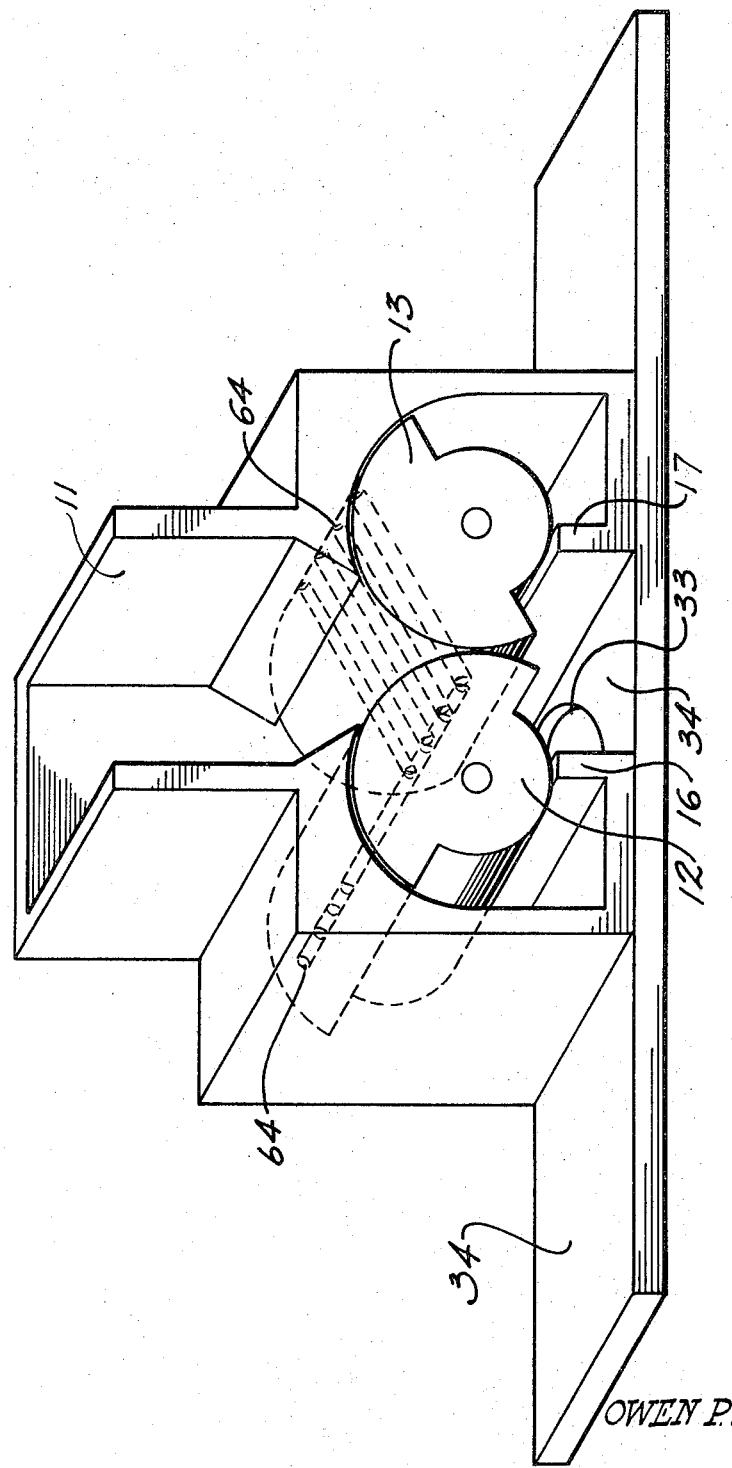

April 11, 1967     O. P. BARNES, JR     3,312,998
MEAT PATTY MACHINE
Filed March 1, 1965     5 Sheets-Sheet 5
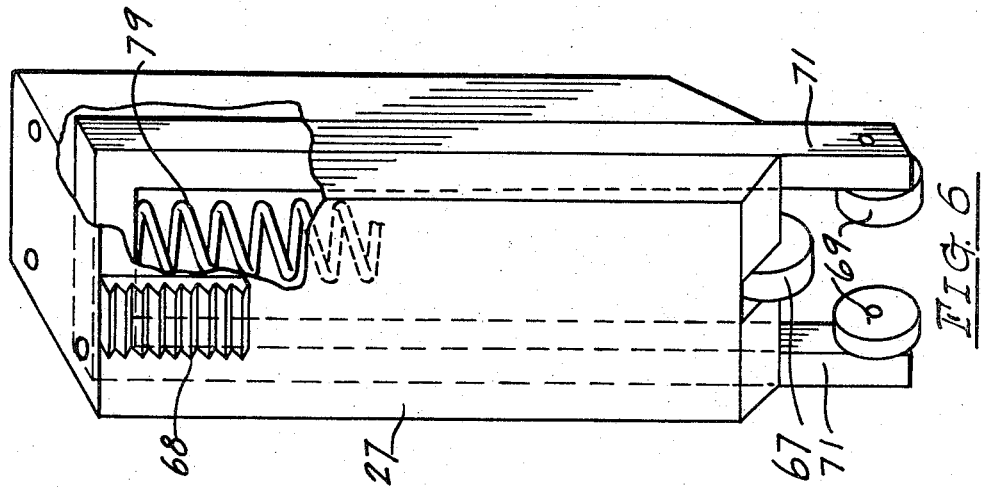
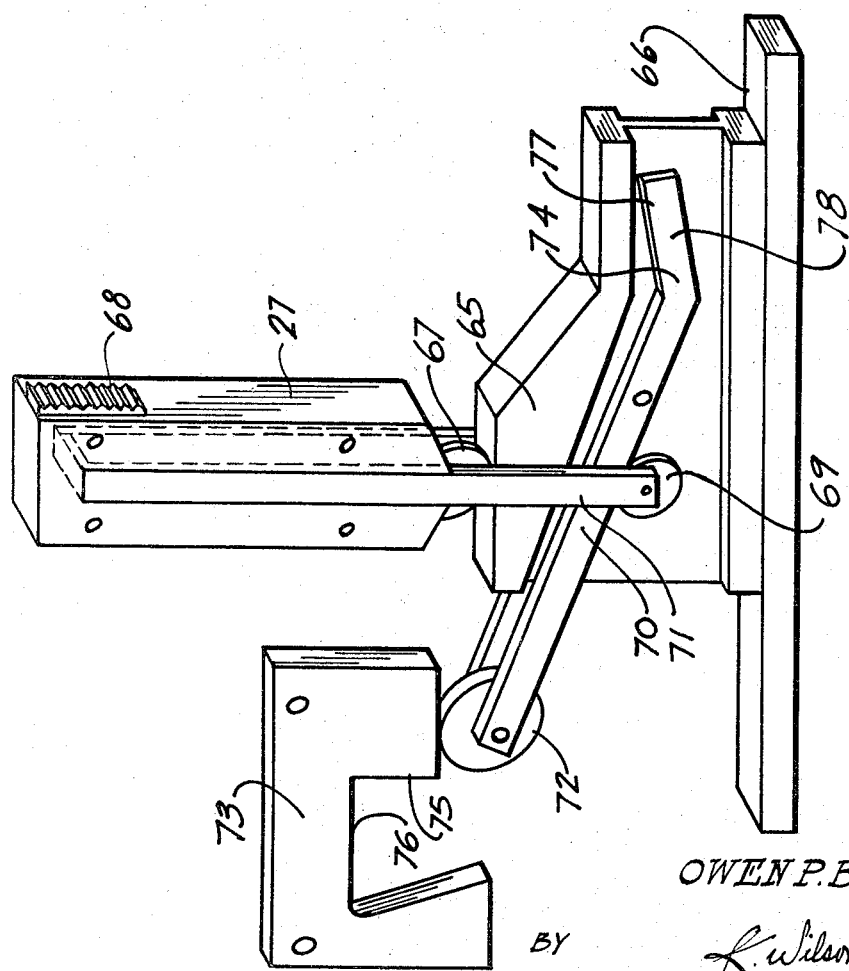
INVENTOR
OWEN P. BARNES, JR.
BY
R. Wilson Corder
ATTORNEY

United States Patent Office 3,312,998
Patented Apr. 11, 1967

3,312,998
MEAT PATTY MACHINE
Owen P. Barnes, Jr., Warner Robins, Ga., assignor, by mesne assignments, of one-half to Dreyfus L. Fountain, Warner Robins, Ga.
Filed Mar. 1, 1965, Ser. No. 435,874
5 Claims. (Cl. 17—32)

This invention relates to materials handling, and more particularly to a new and improved machine for forming ground meat and the like into uniform patties preparatory to cooking or other disposition.

With the coming of age of hamburger industry in America it has become necessary to provide machines for the rapid forming of ground beef into patties which may be then stored under suitable refrigeration before cooking, or even shipping; literally tens of thousands of outlets requiring devices of this type.

Heretofore various mechanisms to accomplish this purpose have been proposed, but such have not been fully successful in that they are complicated, difficult to maintain and service, particularly because of the presence of comparatively large springs therein; lacking in positive action, and often deficient in sanitary features.

An object of this invention is to provide a meat patty machine that is positive in its action.

Another object is to make possible a device of this type that produces a uniform patty regardless of the temperature or the consistency of the material being handled.

Another object is to provide a meat patty machine without springs or other parts subject to fatigue or frequent replacement.

A still further object is to provide maximum sanitation in such a machine.

Another object is to make possible simplicity in a meat patty machine.

Another object is to make possible economy of manufacture of such.

Another object is to make possible a complete handling of patties.

Another object is to facilitate servicing of such a device.

Figure 1:
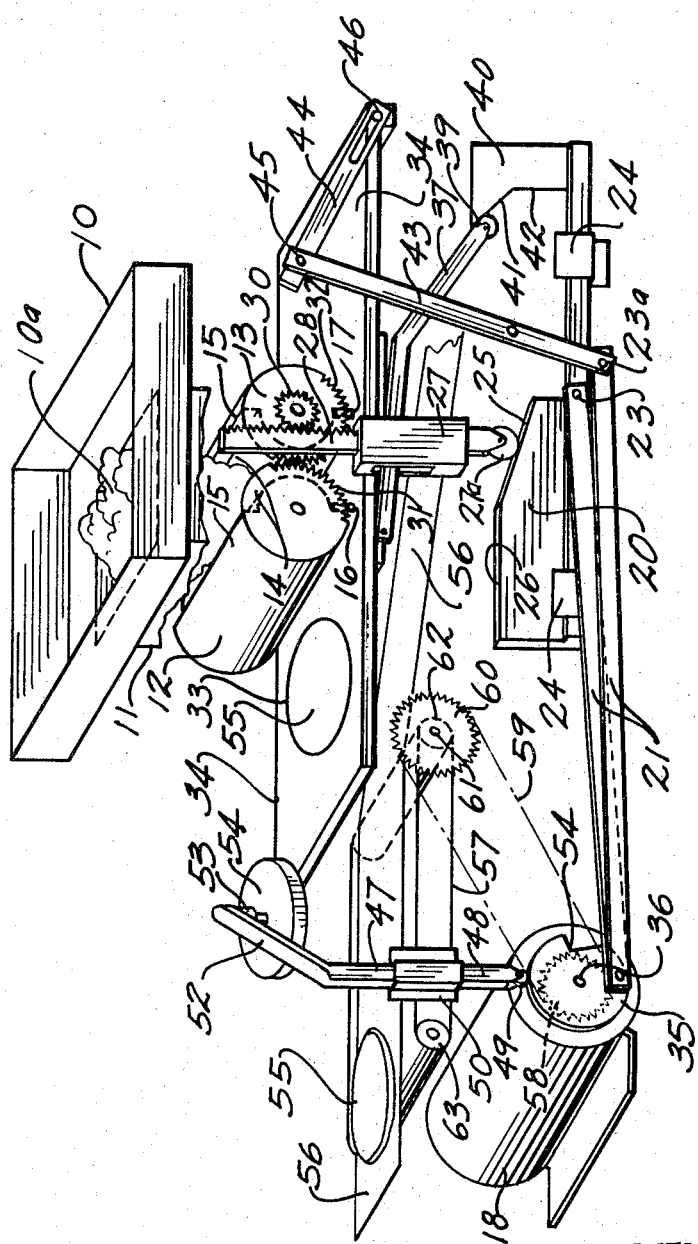
Figure 5:
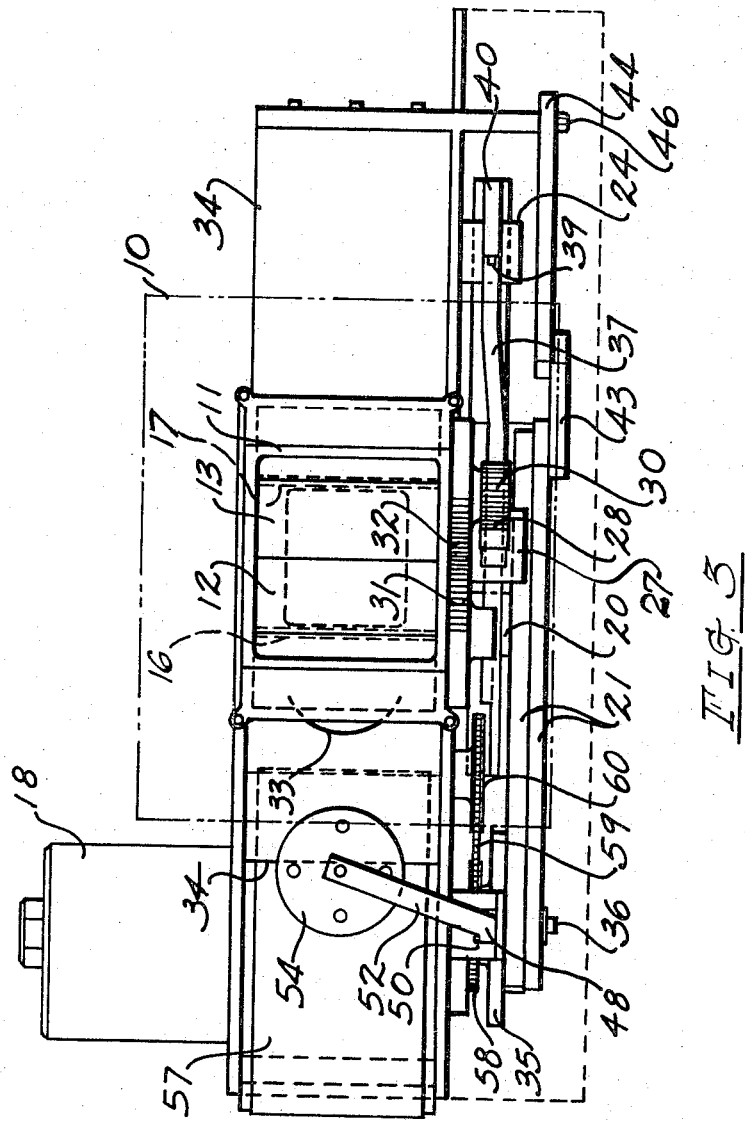

These and other objects are accomplished by means of the instant invention, a full and complete understanding of which is facilitated by reference to the drawings herein, in which:

FIG. 1 is a view in prospective of the instant device, certain parts being broken away for the sake of clearness, FIG. 2 is a side view of the structure of FIG. 1, FIG. 3 is a top view thereof, FIG. 4 is an end view of a modification of the feed rolls as used herein, FIG. 5 is a view of a modification of the cam means used to actuate the feed rolls, said view being isometric in parts, and FIG. 6 is a further view of the structure of FIG. 5, said view being broken away in places.

Referring now to the drawings, FIGS. 1, 2 and 3, the numeral 10 designates a hopper for receiving ground meat 10a or the like, connected with which is chute 11 which permits the meat to fall onto two rotably mounted feed rolls 12 and 13, which rolls have cut away portions 14 and larger segments 15 which meet substantially along their peripheral edges when the rolls are closed as will be described in detail hereafter. Roll 12 is provided with a stop element 16, and 13 with a similar stop 17; roll 12 being contemplated to rotate clockwise until it strikes 16 while the opposite roll moves counter-clockwise until it engages its stop 17. Such rotation is accomplished as follows:

A one-half or other suitable horsepower motor 18 is mounted on supporting framework 19, this power unit turning in a counter-clockwise direction, and being connected with an elevating cam 20 as through linkage 21 at points 22 and 23, said cam sliding on bar 24.

Cam 20 is provided with a uniformly sloping contact surface 25, beyond which it merges into a horizontal surface 26; and above cam 20 is mounted a support box 27 having at its lower end a roller 27a which engages said surfaces 25-26.

Mounted within said box for vertical reciprocation is a gear rack 28, the teeth 29 of which engage a pinion gear 30 fixedly mounted adjacent the end of roll 13. Larger gear surfaces 31 and 32 similarly mounted to mesh adjacent the peripheral edges of rolls 12 and 13, it being apparent that when the gear rack 28 is elevated causing roll 13 to move in a clockwise direction, this same action causes roll 12 to move counter-clockwise to the stop position indicated in FIG. 2. A reversal of this movement results in said rolls being turned in opposite direction, causing rolls 12 and to 13 to close and forcing meat caught in portions 14 thereof downwardly into a cavity 33 formed in a slide plate 34, said cavity being thus filled under the pressure generated by rotation of the rolls, a meat patty being thus formed every two seconds when the gear motor is set to rotate 30 times per minute.

The reversal of the motion described above is accomplished by cam 20 being moved to the right at the end of the stroke generated through disc 35 fixedly mounted on the end of motor shaft 36, operating in conjunction with linkage 21; a further link 37 pivoted as at 38 passing through a slot in gear rack 28 housed in box 27 in such a manner as to then draw said rack sharply downwardly by virtue of roller 39 traveling on cam 40 having guide surfaces 41 and 42. As shown, surface 42 will cause link 37 and hence ratchet gear 28 and rolls 12 and 13 to be speeded up in their movement at the end of the stroke, which in turn results in a more firmly packed and otherwise desirable patty. If desired a cushioning and compensating spring 28a may be provided to operate in conjunction with gear 28.

Simultaneously with the above movements linkage 43-44, pivoted as at 23a-45-46 causes slide plate 34 to move to the left as a fully formed patty is in place in aperture 33, which movement ceases as the patty comes into position under discharge mechanism 47 which consists of a vertical rod or shaft 48 having a roller 49 at one end mounted as at 50 in conjunction with a spring 51 and carrying at its top 52 a hollow cup shaped discharge element through connection 53, said discharge cup being designated 54. Roller 49 travels on disc 35 which is provided with a cam-like indentation 54 in such a manner that when this area is reached, shaft 48 falls sharply by virtue of gravity and the spring load generated by 51, which in turn causes element 54 to impact and discharge the patty 55 below onto a strip of paper 56 traveling on a conveyor belt 57 which conveys the patty to a paper cutter (not shown) which severs the paper between each meat patty, after which the patties may be processed in any desired manner, such as being packaged before storage and refrigeration.

Conveyor belt 57 is actuated by means of a gear 58 fixedly mounted on shaft 36 and acting through chain belt 59 to drive a gear 60 mounted on a shaft 61 in conjunction with a roller 62, it being apparent that said roller along with its companion member 63 affords an endless track for the element 57 to operate. Paper 56 in turn rides on top of said conveyor.

Attention is now directed to FIG. 4 of the drawings which illustrates a modification of the feed rolls of the instant invention, it being apparent that under certain conditions meat pressed into cavity 33 becomes almost solid under the pressures generated near the end of the feeding stroke, with the result that the machine may lock down and overload the motor and the entire feed system.

To avoid this, conventional rolls 12 and 13 are provided with a plurality of longitudinally extending holes or apertures 64 extending from the peripheral edges of said rolls to a point where they will discharge from opposite edges when the rolls in their rotation reach a point where the lower openings are in a position above the patty being formed in slide plate 34. At this point pressure is relieved by permitting meat to pass upwardly and back into the feed box above the rolls, but at the same time maintaining sufficient pressure to press the patty as desired.

FIGS. 5 and 6 illustrate a further modification of the roll actuating mechanism which may be employed herein, including a unique cam arrangement and ratchet gear expediting arrangement. In this connection (FIG. 5) a cam 65 reciprocates on a base 66, and in the position shown, rollers 67 have the feed pressure mechanism including gear 68 pushed completely upwardly so that the rolls in the feed box are open and ready to receive ground meat. As base 66 moves to the left the roller 67 follows the face of cam 65 and rollers 69 follow the face of a cam 70, pulling down arms 71 which in turn cause the pressure mechanism to move downwardly. A roller 72 follows a cam 73, maintaining the position of an arm 74 of the cam of which it is a part. Said arm as it rolls along the face 75 of cam 73 strikes the face 76 of said cam which action sharply raises the outer end of said arm and at the same time causes the other end 77 of the arm to drop. At this point rollers 69 are under the arms at the point 78 and give a final surge of pressure upon the mechanism above to feed meat in a desired manner into aperture 33. The foregoing cycle is repeated with the formation of each individual patty.

FIG. 6 represents a further modification of the pressure mechanism which may be used in conjunction with the cam of FIG. 5, the operation overall being the same as described previously except for the provision of a comparatively large spring 79. In this arrangement, when the meat pressure in the box becomes so great that the machine might jam, roller 67 leaves the cam while rollers 69 continue to follow their cam, which means that the only pressure on ratchet gear 68 is from arms 71 pulling down on compressing spring 79, which pushes against its support box 27 to generate an extra surge of power on the rolls above without representing a positive pressure device.

From the foregoing it is believed that the operation of the instant device is obvious and accordingly such will not be repeated at this point.

While a preferred form of the instant invention has been described in some detail herein, and several modifications likewise disclosed it is apparent that no limitation is intended or implied thereby. It is likewise clear that other and additional modifications, particularly involving cam mechanisms and feed means have likewise suggested themselves; along with various arrangements for indexing, counting, packaging, and otherwise handling formed patties, form part of the instant invention but such are not included herein because of classification and other reasons, but in due course will form the subject matter of additional patent applications.

The following claims are to be a construction and scope fully in keeping with the contribution to the art.

I claim:
1. In a device of the character described, in combination, a supporting framework, a plurality of feed rollers mounted thereon, said rollers having indented portions for receiving ground meat, cam means for actuating said rollers, a plate positioned beneath said rolls, a patty receiving aperture in said plate, and link means for reciprocating said plate from a point of filling to a point of discharge, at least one of said rollers defining an aperture therein to permit the discharge of ground meat.

2. In a device of the character described, in combination, a supporting framework, a plurality of feed rolls mounted thereon, said rolls having indented portions for receiving ground meat, cam means for actuating said rolls, a patty forming plate positioned beneath said rolls, means for reciprocating said plate to a point of discharge and return, means for actuating said cam, rolls and plate, said feed rolls being provided with transverse apertures to permit discharge upwardly of ground meat when the pressure below becomes such as to otherwise stop the machine.

3. In a device of the character described, in combination, a supporting framework, a plurality of feed rollers mounted thereon, said rollers having indented portions for receiving ground meat, cam means for actuating said rollers, a patty forming plate positioned beneath said rollers, means for reciprocating said plate to a point of discharge and return, means for actuating said cam, rolls and plate, one of said rollers being provided with an outlet permitting discharge of ground meat upon registration of said outlet with the area immediately above the patty forming plate when pressure at that point becomes so great as to otherwise stop the machine.

4. A machine of the type utilized for forming meat patties including a chute, at least one movable means disposed within said chute, and a patty forming area positioned adjacent said movable means, whereby meat is fed by said movable means from said chute to said patty forming area, said movable means defining at least one aperture therethrough for bypassing meat from said patty forming area back to said chute.

5. A machine of the type utilized for forming meat patties including a chute, at least one feed means disposed within said chute, and a patty forming surface positioned adjacent said feed means, whereby meat is fed by said feed means from said chute to said patty forming surface under pressure, said machine including means for bypassing a portion of the meat from said patty forming surface back to said chute, said feed means comprising at least one rotatable feed roll, and said bypassing means being located in said feed roll.

References Cited by the Examiner
UNITED STATES PATENTS

| 2,530,062 | 11/1950 | Holly | 17—32 |
| 2,799,893 | 7/1957 | Esper | 17—32 |
| 3,061,872 | 11/1962 | Holly | 17—32 |
| 3,137,029 | 6/1964 | De Zolt | 17—32 |
| 3,203,037 | 8/1965 | Anhanger et al. | 17—32 |

LUCIE H. LAUDENSLAGER, *Primary Examiner.*

SAMUEL KOREN, *Examiner.*